X 7507
E. Trumbull.
Canal Gate.
Patented Apr. 4, 1833.
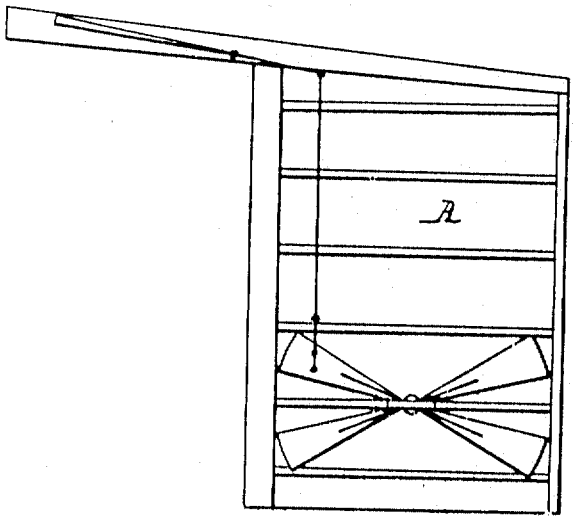
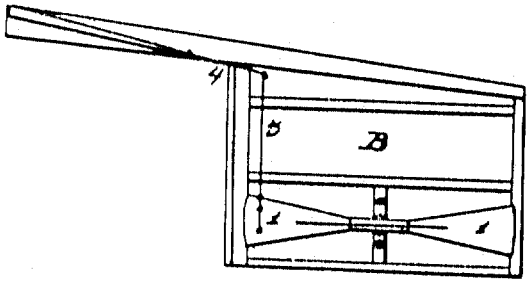
THE GRAPHIC CO. PHOTO-LITH. 39 & 41 PARK PLACE, N.Y.

Earl Trumbull. Little Falls. New York
Letters Patent. 7507X

The schedule referred to in these Letters Patent and making part of the same, containing a description in the words of the said Earl Trumbull himself of his improvement in the Paddle Gate.

To all to whom these presents shall come.

Be it known that I, Earl Trumbull of Little Falls in the County of Herkimer & State of New York, have invented a new and useful improvement in the Paddle Gate for filling & emptying Canal Locks, letting water in & out of Canals, & as a gate to be applied to all purposes for permitting or retarding the passage of water under a pressure or head.

Said improvement is called the Radiating Paddle Gate it may be made of cast or wrought iron or any other metal or of wood. The annexed drawing marked B. represents a large gate of a lock with the radiating paddle attached in its most simple form.

1 & 1. represent two wings of the radiating paddle gate, covering orifices in the main gate, thro' which water is intended to pass. Said Radiating paddle gate, is to be attached to the upper side of the Canal gate & turns on a center.

The face of the Radiating Paddle gate next to the large gate is a plane & slides on the planking of the large gate....

On the outside of the radiating Paddle gate, across the center the gate is made thicker than at the ends of the wings in order to give it sufficient strength.....

When a large quantity of water is required to escape in a short time it may be advisable to add, an additional number of wings, as in figure A. in the annexed drawing

7507X drawing, with a space between each of a width at
least equal to the width of the wing.

2. Represents a step or operating center on which
the radiating paddle gate turns, and thro the center
of which is paſsed a bolt by which said paddle is
attached to the main gate, said operating center, is
varied in size in proportion to the size of the wings.
In one used for the purpose of experiment the opera-
ting center was between four & five inches in diameter
when the radiating Paddle gate was seven & half feet
in length & the wings were fourteen inches wide at the
outer extremity. Said operating center turns in a
Metallic box firmly fixed in the large gate, the outer
surface of said box, being on a plane with the sur-
face of said gate & the operating center sinking into said
box, a sufficient distance to sustain the radiating
paddle gate, & permit the surface of the two gates
to come in contact.

3. Represents a rod, attached to the paddle gate,
for the purpose of opening & shutting the same.

4. Represents a lever by which a power is applied
to open & shut said paddle gate, attached to rod 3. & turning
on a bolt as a fulcrum in the balance beam of the
large gate.

I claim as new & my invention in the
above described apparatus the radiating paddle
gate & its application to canal locks and all
purposes enumerated in the preamble of this
specification.

Witnesses

Earl Trumbull

E. P. Hurlbut

E. A. Phillips

Dr in portfolio 560 wds